United States Patent Office 3,332,794
Patented July 25, 1967

3,332,794
CARBOXY-FREE POLYMERIC COMPOSITION CONTAINING AMMONIUM ZIRCONYL CARBONATE
Robert T. Hart, Rumford, Maine, assignor to Oxford Paper Company, New York, N.Y., a corporation of Maine
No Drawing. Filed Apr. 12, 1966, Ser. No. 541,964
7 Claims. (Cl. 106—194)

This application is a continuation-in-part of my prior applications Serial No. 196,582, filed May 22, 1962, and now abandoned and Serial No. 425,998, filed January 14, 1965.

This invention relates broadly to the insolubilization of water-soluble, high-molecular weight, polymeric organic adhesive materials of natural or synthetic origin which are free of carboxyl groups and provides an improved method for effecting their insolubilization. The invention includes improvements in the art of coating and sizing of various base materials, notably paper, textiles and the like, the compounding of adhesive compositions suitable for those purposes and the resultant coated base materials, the forming of water-resistant laminates and the forming of films, filaments and other shaped objects, either pigmented or unpigmented, supported or unsupported, which resist the solubilizing action of water.

A large variety of high-molecular weight polymeric carboxy free materials are commercially available, or readily produced, which are well adapted for use as adhesives in the fabrication of coatings, laminates or the like and in the forming of films, filaments and other unsupported shapes, but their use has been subject to the disadvantage that they are water-soluble.

Ammonium zirconyl carbonate has previously been disclosed as being useful for the insolubilization of carboxylic acid groups containing materials such as polyacrylic acid and starches containing carboxylic acid groups. The patents to Grummitt et al. 2,758,102 and to Taylor 3,137,588, are illustrative of disclosures of the insolubilization of carboxy containing polymers by ammonium zirconyl carbonate. All of the prior art sets forth that the presence of carboxyl groups is essential to the insolubilizing action and this is understandable in view of the known classic acid-salt reactions. According to this invention, however, it has unexpectedly been found that the particular ammonium zirconyl carboante salt can be used to effectively insolubilize certain water-soluble polymers as disclosed herein which do not contain any carboxylic acid groups.

In accordance with the present invention, a surprisingly large number of such water-soluble, high molecular weight carboxy free polymeric materials, hereinafter more fully identified, may be quickly insolubilized with respect to water, either completely or to a marked extent, by heating the polymer, while in stable aqueous solution, i.e., either true solution or colloidal solution, at a pH within the range from about 5 to about 10, and containing ammonium zirconyl carbonate, to a temperature at which the ammonia of the ammonium zirconyl carbonate is rapidly liberated.

One of the important aspects of the present invention is in the coating of paper and other base materials. In the paper coating art, for instance, a preformed coating composition, usually comprising an adhesive and a pigment in an aqueous medium, is applied to the paper by known means and the thus coated paper passed over heated rolls. It has been recognized as desirable to include in the aqueous coating composition an insolubilizing agent for the water-soluble adhesive so as to avoid the necessity of the after-bath. But heretofore, where it has been attempted to include an inorganic salt of a polyvalent metal in the aqueous coating composition, a precipitation or gelling and an undesirable increase in the viscosity of the coating composition have quickly resulted.

The present invention provides a method and means whereby a readily available and highly effective, wholly inorganic, insolubilizing agent, namely, ammonium zirconyl carbonate, can be incorporated in such coating compositions, or other aqueous solutions containing the herein defined water-soluble polymeric materials, yet at ordinary temperatures, the resultant aqueous coating composition will be stable with respect to premature precipitation and gelling or any substantial viscosity increase over considerable periods, but can be quickly insolubilized by heating to effect rapid liberation of ammonia from the ammonium zirconyl carbonate.

Thus the invention provides means whereby the insolubilization is effected in a highly economical and practical way without necessitating an after-bath. The coating composition, for instance, containing all of the necessary ingredients for forming a water-insoluble coating, including pigments and the like, where desired, may be prepared and applied to the paper, or other base stock, in the usual manner and thereafter rapidly cured thereon by simply heating for a brief period to temperatures conventionally used in the drying of paper stock.

Ammonium zirconyl carbonate, used as the insolubilizing agent in accordance with the present invention, is stable in aqueous medium at a pH within the range from about 5 to about 10, so long as the aqueous medium remains at normal temperatures, and in the stable condition the ammonium zirconyl carbonate is ineffectual in insolubilizing, precipitating or gelling the herein specified polymeric materials within practical time limits. Also, within the spechified pH range, the ammonum zirconyl carbonate, or a decomposition product thereof, is highly effective in quickly insolubilizing these water-soluble polymeric materials when the aqueous solution is heated to a moderate temperature as previously described. So far as I am aware, none of the other inorganic salts of any of the polyvalent metals, such as previously suggested as insolubilizing agents for adhesives, possesses the unique characteristics of ammonium zirconyl carbonate.

In accordance with the preferred aspect of this invention, the ammonium zirconyl carbonate is included in the aqueous solution of polymeric material prior to shaping, but the invention also contemplates the wetting of the shaped object with an aqueous ammonium zirconyl carbonate solution, either prior to or subsequent to drying, and thereafter drying the shaped object in the presence of the ammonium zirconyl carbonate. Also, while the rapid insolubilization or curing of the polymeric material by the application of heat, as heretofore described, is a highly desirable aspect in many of the commercial applications of this invention, notably in the coating of paper and in the forming of self-supporting films or filaments, where the time element is of less importance, the insolubilization reaction can advantageously be effected by ordinary air-drying over a period of time, usually one day or more, without any substantial external application of heat. Also, any combination of air-drying and heating may be employed.

Reference herein and in the accompanying claims to "shaping" of the polymeric material will be understood to mean the applying of the polymeric material, while in aqueous solution as a coating or sizing to paper, textiles or other base materials or the forming therefrom of films, filaments or other shaped objects, pigmented or unpigmented.

More particularly, to effect this rapid insolubilization with respect to water, in accordance with the preferred aspect of my invention, the solution of the polymer containing the ammonium zirconyl carbonate is heated to a temperature at which the ammonium zirconyl carbonate is decomposed, liberating ammonia. The duration of such heating is subject to considerable variation depending primarily upon the temperature. For instance, at temperatures of about 200° F., a time period of about one minute has, in many cases, been found adequate. At higher temperatures, even shorter heating periods will suffice. Care should, of course, be exercised to avoid temperatures so high as to cause deterioration of the adhesive or base material.

An essential characteristic of the polymeric adhesive materials, used in accordance with this aspect of my present invention, is that they be water-soluble, or colloidally dispersible in water, at a pH within the said range from about 5 to about 10, forming a solution which, at normal temperature, is not precipitated or gelled by the presence of ammonium zirconyl carbonate. Further, it is essential that the polymer used in accordance with my invention, in its broader aspect, be one which is capable of forming coordinate or covalent bonds with the zirconium atom or the forming of zirconium carboxylate salts upon reacting the polymer with the decomposition product (believed to be $ZrO^{++}$) of the ammonium zirconyl carbonate. The polymer so used must have sufficient functional groups other than carboxyl groups to be capable of forming the aforementioned types of bonds with the zirconium atom.

Polymeric materials, which meet the first said, as well as the other requirements, and may be used in accordance with the preferred aspect of my present invention, include water-soluble, synthetically produced, cellulose derivatives, such as hydroxyethyl cellulose or carboxymethyl hydroxyethyl cellulose; natural gums consisting essentially of acidic arabinoxyloglycan or complex polysaccharide; maleic anhydride copolymers, such as copolymers of the partial esters of SMA or high molecular SMA copolymers (SMA meaning styrene-maleic anhydride) polymeric acid derivatives, such as polyacrylamide, methylolated polyacrylamide or potassium polyacrylate; and other synthetics, such as polyvinyl alcohol, polyvinyl pyrrolidone or synthetic carbohydrate polymers.

While the invention is applicable to all polymeric materials having the essential properties just noted, and the resultant product, in each case, serves a useful purpose in the art, the products produced therefrom, in accordance with the present invention, are not necessarily equivalent for all purposes.

Though a primary advantage of this invention is the ability to include the insolubilizing agent in the polymer solution, supplemental thereto or in lieu thereof, the insolubilization of the polymer may also be promoted, where desired, by subjecting the coated base material or unsupported film or filament to an aftertreatment by wetting it with an aqueous solution of ammonium zirconyl carbonate and thereafter heating to the previously stated temperature or drying at ordinary room temperature.

For instance, the insolubilizing reaction may be affected in part or exclusively by first forming the coating or film or the water-soluble polymer and then thoroughly wetting the polymer with an aqueous solution of the ammonium zirconyl carbonate, as by passing it through a batch of such solution, and then subjecting the coating or filament or the like to drying or to the reaction temperature while wet with the ammonium zirconyl carbonate solution. However, in most instances, it has been found more advantageous to include the ammonium zirconyl carbonate in the polymer solution before applying the coating or forming the film. This is especially true with respect to the paper industry where an after-bath of the dried, coated web is usually not economically or practically feasible.

I have, in some experimental operations, hereinafter described, obtained a high degree of insolubilization by the procedure involving the subsequent washing of the coating, for instance, with an aqueous ammonium zirconyl carbonate solution, as opposed to including the ammonium zirconyl carbonate in the coating composition. Where desired, the insolubilization may be effected, in part, by including in the coating composition an amount of ammonium zirconyl carbonate insufficient to effect complete insolubilization of the polymer and the insolubilization completed by an afterbath with an aqueous ammonium zirconyl carbonate solution.

Polymeric materials which are incompatible with ammonium zirconyl carbonate in aqueous solution but may be used in accordance with my invention under conditions which do not require the presence of the ammonium zirconyl carbonate in the preformed aqueous solution of the polymeric material and are insolubilized by washing a preformed coating or clear film thereof with an aqueous bath of ammonium zirconyl carbonate, e.g., a 5% solution, include: polyvinyl methyl ethers of maleic acid, such as marketed under the trade name "PVM/MA"; D-galacto-D-monoglycan (guar gum) such as marketed under the trade name "Locust Bean Gum," mixtures of Guar and Locust Bean gums; and mixtures of D-galactose, D-xylose and D-glucose, such as marketed under the trade name "Tamarind Seed Gum" in which the respective constituents are present in weight ratios of about 1:2:3.

The optimum proportion of ammonium zorconyl carbonate (AZC) to be used is subject to considerable variation depending primarily upon the nature of the polymeric material to be insolubilized and also the degree of insolubilization desired. In most instances, a proportion of AZC equivalent to about 10% by weight of the polymeric material (dry basis) has been found adequate, though in some instances proportions of AZC ranging as high as 50% have been used with advantage. Some insolubilization will be obtained using only a fraction of 1% of AZC, but usually a proportion of AZC in excess of about 1%, based on the dry weight of the polymer, is preferred. When used as an after-bath or wash, a 5% aqueous solution has given excellent results.

The utility and effectiveness of my invention are abundantly demonstrated by the following specific examples directed to two important aspects thereof, namely, the forming of water-insoluble, pigmented coatings on paper and the forming of unpigmented films on a base material. It will be understood that the scope of the invention is not restricted to the subject matter of these examples but also includes the producing of self-supporting films, filaments and other cast, molded or extruded objects and the coating and impregnating of materials other than paper.

For reasons of simplicity and convenience in presenting test data in tabulated form, the individual polymeric materials used in the specific examples will be identified by number in the following tabulations, the significance of the respective numbers being as follows:

*Cellulose derivatives*

(1) A water-soluble, medium molecular weight hydroxy-ethyl ether of cellulose marketed by Union Carbide Chemical Company under their proprietary name "HEC WP–40."

(2) A highly substituted hydroxyethyl ether of cellulose completely soluble in cold water marketed under the trade name "Natrosol 250."

*Natural gums and polysaccharides*

(3) A water-soluble hydrocolloid obtained by the limewater extraction of hulls or corn kernels which appears to be a molecularly homogeneous, acidic arabinoxyloglycan belonging to the class of substances known as hemicelluloses and commercially known as "Corn Hull Gum."

(4) A gum, known commercially as "Karaya gum," which consists essentially of an acetylated polysaccharide characterized by an acidic nature and relatively low solubility in water, its molecular weight being in the vicinity of 9,500,000.

(5) Irish moss or carrageen produced by drying the seaweed *Chondrus crispus* and comprising 70% to 75% of the calcium salt of a sulfuric ester of a colloidal carbohydrate complex containing a high proportion of galactose groups.

*Maleic anhydride copolymers and polymeric acid derivatives*

(6) A polyacrylamide of approximately 750,000 molecular weight, marketed by American Cyanamid Company under its proprietary name "PAM 75."

(7) Methylolated polyacrylamide.

*Other synthetics*

(8) A hight molecular weight polyvinyl alcohol containing approximately 2% acetate groups on the polymer chain and marketed by E. I. du Pont de Nemours & Co. under its proprietary name "Elvanol 72–51."

(9) A high molecular weight polyvinyl alcohol containing approximately 12% acetate groups on the polymer chain and marketed by E. I. du Pont de Nemours & Co. under its proprietary name "Elvanol 50–42."

(10) A high molecular weight water-soluble synthetic polysaccharide having a molecular weight of over 5,000,000 produced by fermentation of sucrose and the polymerization induced by the organism *Leuconostoc mesenteroides*, strain B–512, marketed by R. K. Laros Company under its proprietary name "Dextran CR."

(11) An aqueous solution of polyvinyl pyrrolidone containing 45% solids marketed by General Aniline and Film Corporation under its proprietary name "PVP K–60."

In each of the following examples, a composition suitable for coating paper, and consisting of an aqueous solution of the respective polymers containing pigmentary clay, was prepared at a pH within the range of 5–10. To one portion (A) of each of these coating compositions, ammonium zirconyl carbonate was added. To a second portion (B), no ammonium zirconyl carbonate or other insolubilizing agent was added.

Each of these coating compositions was applied to a 55-pound per ream size press coated paper stock, on one side only, by means of a Mayer coating rod set for 10 pounds per ream.

The paper to which the coating composition A had been applied was then heated to a temperature of about 180° C. for a period of 1½ minutes for drying and insolubilizing the coating.

A further portion of the paper to which coating composition B had been applied was, for comparative purposes, likewise heated to a temperature of 180° C. for a period of 1½ minutes.

A second portion of the paper to which coating composition B had been applied was passed through an aqueous bath containing 5% of ammonium zirconyl carbonate and the coated paper, with its coating thereon, wet with the bath solution, was then heated to a temperature of 180° C. for 1½ minutes.

Following these heat treatments, the coating composition on each of the papers was tested for water-solubility by the conventional method of abrading the previously wetted sheet vigorously with the forefinger ten times and transferring the removed coating to a black sheet which was then dried and examined for amounts of so-removed white coating.

The identity of the specific polymer used, identified by number, the proportion of solids in the respective polymeric materials, the proportion of polymer per 100 parts of clay in each of the coating compositions, the percentage of ammonium zirconyl carbonate used in the respective coating compositions A, based on the amount of polymer used (all on a dry-weight basis) and the pH of the respective coating compositions A to which the AZC was added are set forth in the following tabulation. Also, included in the tabulation are the results of the water-insolubility test in each instance, expressed as percent of water-insolubility of the coating composition, and determined by the test method just identified.

TABLE 1

| | Identity of Polymeric Material (PM) | Percent Solids in PM | Parts PM per 100 Parts Clay | Degree of Insol. of Control B, Percent | Percent AZC in A, Based on PM | pH of A | Degree of Insol. of A, Percent | Degree of Insol. of B given AZC wash, Percent |
|---|---|---|---|---|---|---|---|---|
| Cellulose Derivatives | 1 | 5 | 14 | 50 | 10 | 6 | 90 | 100 |
| | 2 | 10 | 14 | 25 | 10 | 6 | 80 | 100 |
| Natural Gums and Polysaccharides | 3 | 8 | 20 | 20 | 10 | 6 | 100 | 100 |
| | 4 | 1 | 20 | 60 | 10 | 5 | 60 | 100 |
| | | | | | 20 | | 90 | |
| | 5 | 2 | 20 | 50 | 10 | 7 | 50 | 85 |
| Maleic Anhydride Copolymers and Polymeric Acid Derivatives | 6 | 6 | 10 | 0 | 10 | 5.5 | 50 | 100 |
| | 7 | 10 | 10 | 50 | 10 | 5 | 100 | 100 |
| Other Synthetics | 8 | 8 | 10 | 0 | 10 | 6 | 100 | 100 |
| | 9 | 8 | 10 | 50 | 10 | 6 | 100 | 100 |
| | 10 | 6 | 20 | 50 | 10 | 6 | 100 | 100 |
| | 11 | 10 | 10 | 0 | 10 | 6 | 25 | 90 |

To illustrate the effectiveness of my present invention in insolubilizing these polymeric materials by air-drying alone, portions of the paper coated with composition A, in which the polymeric materials were those identified by the numbers 8, 9 and 11 respectively, were air-dried for 7 days without external application of heat. In each instance the insolubilization obtained was substantially equivalent to that resulting from heating the coated paper for a period of 1½ minutes at a temperature of 180° C.

In the following specific examples, clear unpigmented films were produced from aqueous solutions of the numerous polymeric materials heretofore identified. To a portion of each of these solutions, designated A, an amount of ammonium zirconyl carbonate was added and to a further portion of each solution, designated B, and used as a control, no AZC was added. A film of each of the resultant solutions was cast on a glass microscope slide by dipping the slide into the solution and heat-treating and drying at a temperature of 180° C. for a period of 1½ minutes. The thickness of the films thus formed on the slides was approximately 3 mils.

After thus heat-curing and drying, under identical conditions the respective slides with the films thereon were submerged in water at room temperature and the water-solubility of the respective films determined by periodic checking. The identity of the respective polymeric materials (designated PM and identified by number), the percent solids of the PM, the amount of AZC added and the results of the solubility tests are set forth in the following tabulation:

precipitation of the polymer, but when included in compositions such as shown, for instance, in the foregoing

TABLE 2

|  | PM | Percent Solids in PM | Solubility of Control B | Parts AZC per 100 Parts PM-A | Solubility of A |
|---|---|---|---|---|---|
| Cellulose Derivatives | 1 | 5 | Dissolved after 3 hrs | 2.5 | 4 hrs. soft, 4 days same. |
|  | 2 | 10 | 20 min. dissolved | 5.0 | 16 hrs. dissolved. |
| Natural Gums and Polysaccharides. | 3 | 8 | 1 hr. dissolved | 4 | Spread out but not dissolved after 3 days. |
|  | 4 | 2 | 3 hrs. soft, 4 days same | 1 | 4 hrs. hard, 4 days hard and clear. |
|  | 5 | 2 | Dissolved after 2 hrs | 1 | 4 hrs. start to dissolve, 19 hrs. dissolved. |
| Maleic Anhydride Copolymers and | 6 | 5 | 3 hrs. dissolved | 2.5 | 4 hrs. soft, 4 days soft and clear. |
| Polymeric Acid Derivatives | 7 | 10 | 4 hrs. soft, 4 days same | 5.0 | 4 days hard and clear. |
| Other Synthetics | 8 | 8 | 12 hrs. dissolved | 4 | No change after 3 days. |
|  | 9 | 8 | Dissolved in 4 hrs | 4 | 4 hrs. soft, 20 hrs. dissolved. |
|  | 10 | 6 | Dissolved after 3 hrs | 3 | 4 hrs. soft, 4 days same. |
|  | 11 | 10 | 25 min. dissolved | 5.0 | No change after 3 days. |

The proportions of solids in the polymeric materials do not appear to be at all critical and are not restricted to those proportions set forth in the foregoing tabulations, but may vary over a considerable range. For instance, the proportions of solids in the polymeric materials 2 and 11 may vary over a range from about 5 to about 15%; in those materials identified by the numerals 1 and 6, may vary over a range from about 2 to about 8%; in materials 3, 8 and 9, may vary over a range from about 2 to about 10%; in 10, from 3 to 8%; in 5, from 1 to 3%; and in 7, from 5 to 12%.

Though in each of the foregoing examples, the inorganic pigment, where used, was clay, it will be understood that other inorganic pigments may be used effectively, for instance finely-divided calcium carbonate, titanium dioxide, blanc fixe or satin white. The concentration of the pigment may vary widely and can conform to standard practices of the industry.

Also, in lieu of a single polymeric material, the invention also contemplates the use of a mixture of two or more compatible polymeric materials of the type hereindefined. Various other additives can also be used such as minor amounts of other adhesives, defoamers, dyes, and other standard additives, without departing from the scope or purpose of my invention.

I have, with particular advantage, used for the purpose of my present invention, ammonium zirconyl carbonate produced by reacting zirconium oxychloride, in theoretical proportions, with ammonium carbonate in aqueous solution containing a small amount of ammonium hydroxide, e.g., about 1% of the weight of the ammonium carbonate. This reaction may be readily accomplished simply by dumping the zirconium oxychloride into a 20-30% ammonium carbonate solution containing a small proportion of added 28% ammonia water, the reaction occurring immediately at room temperature. In addition to the ammonium zirconyl carbonate, the reaction results in the formation of ammonium chloride which is retained in the ammonium zirconyl carbonate.

I have found that the presence of ammonium chloride in the AZC used in insolubilizing these polymeric materials, in accordance with my present process, catalyzes the insolubilization reaction and materially shortens the curing time.

In place of the zirconium oxychloride, other soluble zirconium salts may be used; for instance, zirconium sulfate, but superior results have been obtained where the zirconium oxychloride is used, especially in view of the presence of ammonium chloride in the resultinz AZC.

Instead of producing the ammonium chloride in the AZC-forming process, it may be subsequently added to the AZC or may be separately added to the polymeric material in catalytic proportions, for instance, amounts less than 10% of the AZC used. Its presence in the polymeric material does not cause premature gelling or precipitation of the polymer, but when included in compositions such as shown, for instance, in the foregoing examples, the curing time, at comparable temperature, is reduced by up to 50%.

I claim:
1. The process for producing shaped water-insoluble compositions from water-soluble adhesive materials which comprises preparing an aqueous solution of a water-soluble, high molecular weight, polymeric organic adhesive free of carboxylic acid groups and selected from at least one member of the group consisting of hydroxyethyl ethers of cellulose, lime-water extracts of corn kernel hulls, acetylated polysaccharides, polysaccharides, Irish moss, maleic anhydride copolymers, polyacrylamide, methylolated polyacrylamide, polyvinyl alcohol, and polyvinyl pyrrolidone, shaping the solution and drying the shaped solution in the presence of ammonium zirconyl carbonate with liberation of ammonia.

2. The process according to claim 1 in which the insolubilization reaction is catalyzed by the presence of ammonium chloride.

3. The process for producing shaped water-insoluble compositions from water-soluble adhesive materials which comprises preparing an aqueous solution of a water-soluble, high molecular weight, polymeric organic adhesive free of carboxylic acid groups and selected from at least one member of the group consisting of hydroxyethyl ethers of cellulose, lime-water extracts of corn kernel hulls, acetylated polysaccharides, polysaccharides, Irish moss, maleic anhydride copolymers, polyacrylamide, methylolated polyacrylamide, polyvinyl alcohol, and polyvinyl pyrrolidone, and an amount of ammonium zirconyl carbonate sufficient to render the adhesive substantially insoluble in water upon drying, said solution having a pH within the range from about 5 to 10, shaping the solution and drying the shaped solution with liberation of ammonia.

4. The process according to claim 3 in which the solution contains a catalytic amount of ammonium chloride.

5. A composition of matter comprising a stable aqueous solution of a water-soluble, high molecular weight, polymeric organic adhesive free of carboxylic acid groups and selected from at least one member of the group consisting of hydroxyethyl ethers of cellulose, lime-water extracts of corn kernel hulls, polysaccharides, acetylated polysaccharides, Irish moss, maleic anhydride copolymers, polyacrylamide, methylolated polyacrylamide, polyvinyl alcohol, and polyvinyl pyrrolidone, having a pH within the range from about 5 to 10 and containing ammonium zirconyl carbonate in an amount sufficient to render the adhesive material substantially insoluble in water upon drying.

6. A composition of matter according to claim 5 in which the aqueous solution also contains a catalytic amount of ammonium chloride.

7. The process for producing water-insoluble coatings on a base from water-soluble adhesive materials which comprises preparing an aqueous solution of water-soluble, high molecular weight, polymeric organic adhesive free of carboxylic acid groups and selected from at least one member of the group consisting of hydroxyethyl ethers of cellulose, lime-water extracts of corn kernel hulls, acetylated polysaccharides, polysaccharides, Irish moss, maleic anhydride copolymers, polyacrylamide, methylolated polyacrylamide, polyvinyl alcohol, polyvinyl pyrrolidone, polyvinyl methyl ethers of maleic acid, and guar gum, coating the solution on a base, contacting the coated adhesive with an aqueous solution of ammonium zirconium carbonate in a sufficient amount to render the adhesive insoluble in water upon drying and drying the coating.

References Cited
UNITED STATES PATENTS

| | | | |
|---|---|---|---|
| 2,304,252 | 12/1942 | Hager et al. | 117—62.1 |
| 2,758,102 | 8/1956 | Grummitt et al. | 260—29.6 |
| 2,842,451 | 7/1958 | Grummitt et al. | 106—194 |
| 3,073,723 | 1/1963 | Deal et al. | 117—155 |
| 3,079,358 | 2/1963 | Uelzmann | 260—29.7 |
| 3,137,588 | 6/1964 | Taylor | 117—62.2 |
| 3,296,171 | 1/1967 | Hennes et al. | 260—29.6 |

ALEXANDER H. BRODMERKEL, *Primary Examiner.*

D. J. ARNOLD, *Assistant Examiner.*